United States Patent [19]

Scheler

[11] 4,068,545
[45] Jan. 17, 1978

[54] METHOD OF AND APPARATUS FOR FEEDING NONROUND-SECTION BARS TO SCREW MACHINES

[75] Inventor: Holger Scheler, Klausdorf, Schwentine, Germany

[73] Assignee: Hagenuk Vormals Neufeldt & Kuhnke GmbH, Kiel, Germany

[21] Appl. No.: 709,284

[22] Filed: July 28, 1976

[30] Foreign Application Priority Data

Aug. 26, 1975  Germany .............................. 2537852

[51] Int. Cl.² .............................................. B23B 13/02
[52] U.S. Cl. ....................................... 82/1 C; 82/2.5; 82/2.7; 214/1.3
[58] Field of Search .......................... 82/2.7, 2.5, 1 C; 214/1.1, 1.2, 1.3, 1.4

[56] References Cited

U.S. PATENT DOCUMENTS 3,602,075  8/1971  Waefler .................................... 82/2.5

FOREIGN PATENT DOCUMENTS 2,055,904  11/1970  Germany ................................. 82/2.5
1,186,949  4/1970  United Kingdom ..................... 82/2.5

Primary Examiner—Leonidas Vlachos
Attorney, Agent, or Firm—Michael J. Striker

[57] ABSTRACT

A screw machine has a headstock provided with an openable and closable chuck rotatable at high speed and having a throughgoing aperture of cross-sectional shape complementary to that of a bar to be machined in the screw machine. A feed apparatus for this machine comprises means for detecting the rotational speed of the chuck and for generating a speed output when the rotational speed lies within a predetermined range. In addition, a pusher is provided which only advances the bar into the aperture of the chuck after generation of the output. This pusher is engageable with an abutment that is only displaced out of its way when the speed output is generated. Furthermore the apparatus generates a position output when the bar is properly in place and has a timer which withdraws the bar from the chuck if within a predetermined time limit after generation of the speed output the position output is not generated, indicating that the apparatus is unable to load the bar.

10 Claims, 3 Drawing Figures

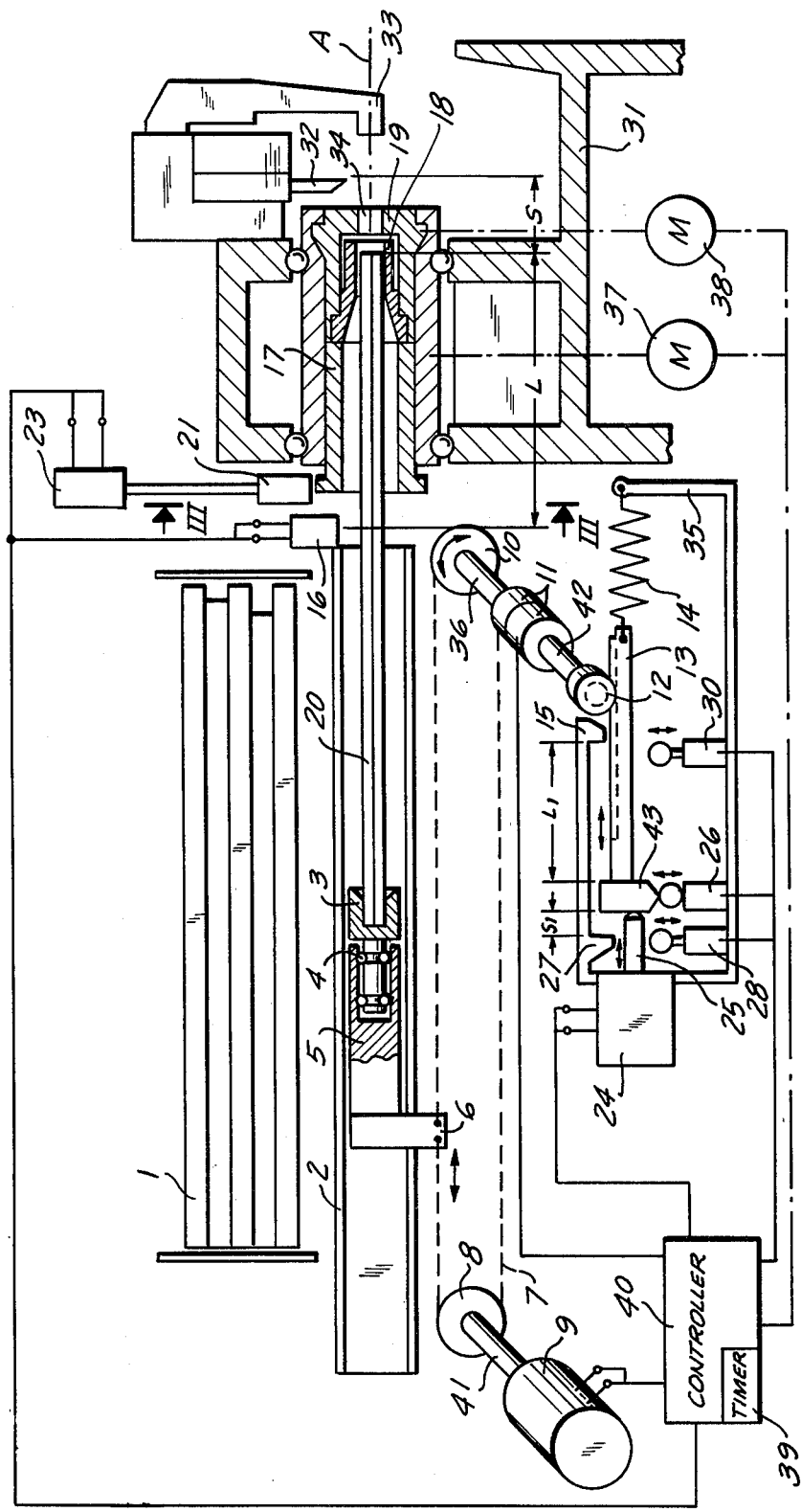
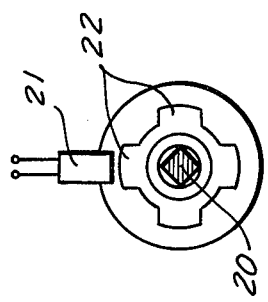
FIG. 2
FIG. 3

METHOD OF AND APPARATUS FOR FEEDING NONROUND-SECTION BARS TO SCREW MACHINES

BACKGROUND OF THE INVENTION

The present invention relates to an automatic lathe. More particularly this invention concerns an apparatus for feeding profiled bars to a screw machine.

A screw machine is an automatic lathe through whose headstock workpieces to be machined can be fed in. Typically such machines are used for the serial production of turned workpieces.

In order to maximize the efficiency with which such a machine operates it is standard practice to provide it with an automatic feed device. Such an apparatus has a magazine of bars which are to be turned down in the screw machine and with means for advancing them sequentially through the chuck of the machine into a desired position. The feed apparatus as described in commonly assigned copending patent application Ser. No. 594,285 (now U.S. Pat. No. 4,006,654) whose entire disclosure is also herewith incorporated by reference, has a bar-holding clamping sleeve which grips the rear end of the bar and is connected via a bearing to a pusher. A chain drive or the like advances this pusher along the rotation axis of the headstock so that a bar engaged in its clamping sleeve can be advanced axially through the headstock, from the back thereof. Once the bar has passed through the headstock the collet thereof is clamped on it and the machining operation can take place.

Such an arrangement is relatively simple so long as the bars are of round cross-sectional shape. It has, however, been found very useful in practice to employ bars of non-round cross-sectional shape. Frequently square or otherwise polygonal sectional are employed in order to facilitate subsequent machining, as the facets of such workpiece need not subsequently be milled into it. In such arrangements the collet invariably has a hole of the same cross-sectional shape as the bar by which is meant the collet closely engages one or more facets of the bar and has an aperture which is not round. Thus a triangular aperture can be used with triangular, hexagonal, or nonagonal shapes. Complementary collet apertures and bar sections ensures excellent driving of the bar by the collet so that machining is greatly facilitated.

The disadvantage of using such nonround-section bars is that the bar must be exactly aligned with the collet aperture in order to fit the bar through this aperture. In a manual loading operation this is simply achieved by manually pressing the front end of the bar against the back end of the arrested collet and turning the bar until it fits through the collet. The relatively light pressure needed for such manual interfitting of the two parts eliminates the possiblity of damaging either the collet or the bar during such loading.

The various known feed devices for polygonal-section bars almost all require a separate arrangement for arresting the collet in a predetermined angular position. Not only does this increase the cost of the screw machine, but it slows down the loading operation considerably as the often massive collet must be brought to a complete stop in a predetermined position before the bar advance operates. Furthermore, such an arrangement is not readily applicable to existing screw machines which are not provided with a collet-stopping arrangement.

It has also been suggested to provide a feed apparatus which automatically rotates the bar before insertion into the collet at the same speed as the collet and only presses to the two together when the speeds are substantially the same. Such an arrangement is extremely complicated and expensive. Furthermore such an arrangement cannot readily be adapted for use with existing screw machines.

Various prior-art feed devices are shown in German Pat. No. 2,055,904, in German utility models Nos. 1,993,771 and 6,911,266 (U.S. Pat. No. 3,602,075)

SUMMARY OF THE INVENTION

It is therefore an object of the present invention to provide an improved screw machine.

Another object is the provision of an improved apparatus for feeding nonround-section bars to a screw machine.

Yet another object is the provision of such an arrangement which works rapidly and without damage to either the bar or the machine collet.

Another object is to provide a feed apparatus which can readily be used with an existing automatic lathe.

These objects are attained according to the present invention in an arrangement wherein the rotational speed of the collet of the headstock is detected and the nonround-section bar is only advanced into the collet when this speed drops below a predetermined limit. Thus means is provided for detecting the rotational speed of the collet and for generating an output when this speed drops below a predetermined limit.

In accordance with a further feature of this invention the bar is first advanced to a position immediately adjacent the collet and further advance of the bar is inhibited until the output is generated. This is effected by providing an abutment displaceable by means of an electromagnet out of the way of an element linkable to the pusher for the bar.

The apparatus according to this invention is further provided with means for generating a position output when the bar has been advanced to the collet and with means for withdrawing bars from the collet after advance of the bar into the collet when a predetermined time period elapsed after generation of the speed output and before generation of the position output. Thus when the bar and the aperture of the collet are misaligned and the bar merely bumps the back of the collet but does not pass through it, the machine automatically will withdraw and attempt to fit the two together again. Means is also provided in accordance with this invention for shutting down the entire machine if after a pedetermined number of tries the apparatus is unable to fit the bar through the collet. Such a situation develops when a bar of the wrong-cross-sectional shape is employed or a damaged bar is used.

With the system according to the present invention it is therefore possible rapidly to load bars into the screw machine. It is not necessary to provide additional devices for stopping rotation of the lathe collet, and indeed it is not absolutely essential to wait for the collect to stop rotating completely before a bar is fed into it. Indeed, relatively slow rotation of the collet only aids in the feeding operation. According to this invention it is also irrelevant whether the lathe has been operated for a long time so that the amount of time it takes to attain the maximum rotation speed at which it machines the bar and the amount of time it takes to slow down after disconnection of its drive is very long or whether the machine is still relatively cold so that it starts up sluggishly and slows down rapidly. Under both situations the device will operate the same and only feed in a bar within a predetermined rotation speed range, usually around one half revolution per minute.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWING

FIG. 2 is an axial section partly in diagrammatic form through the apparatus according to the invention; and FIG. 3 is a section taken along line III—III of FIG. 2.

SPECIFIC DESCRIPTION OF PREFERRED EMBODIMENT

Figure 1:
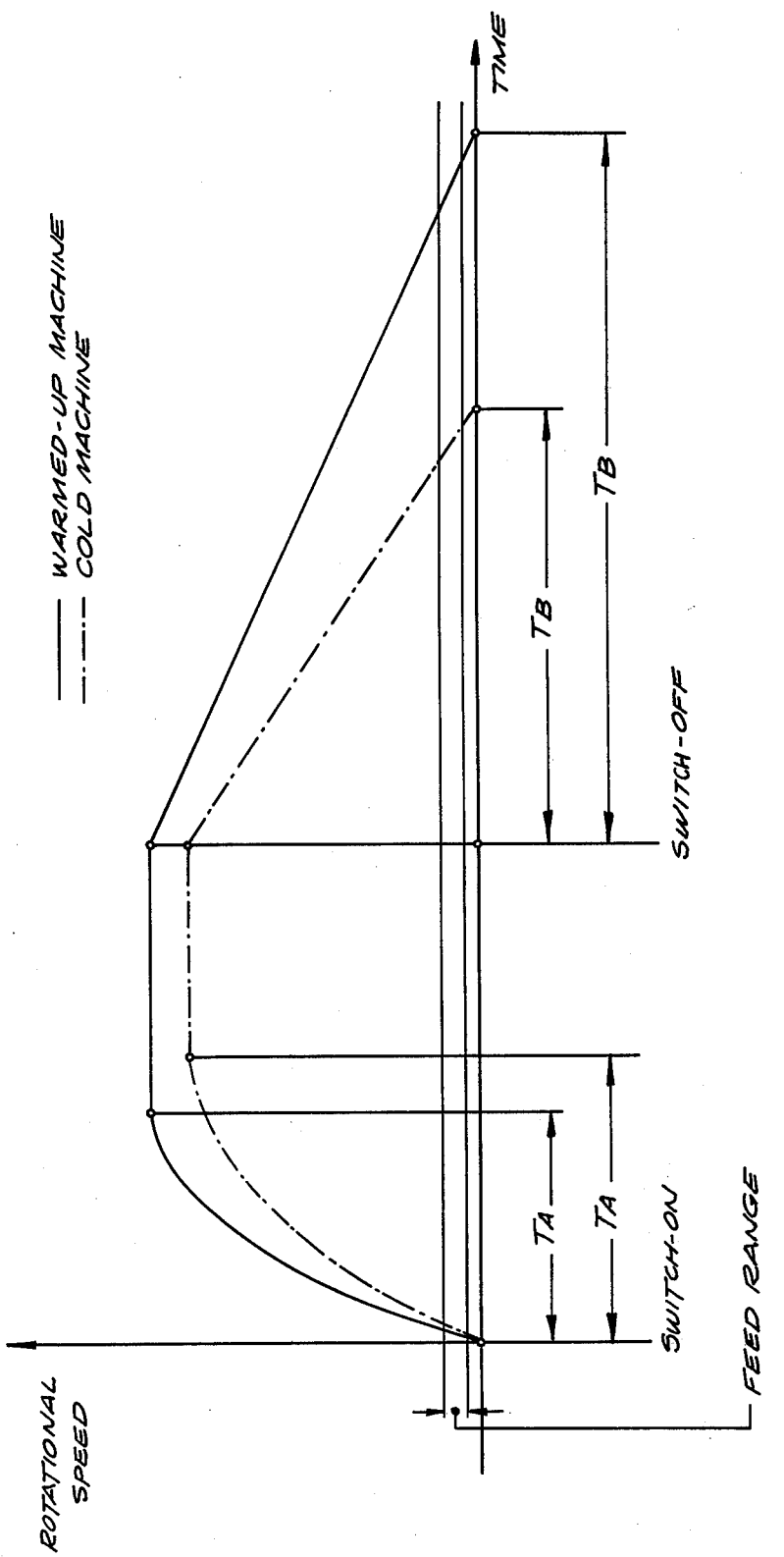
FIG. 1 is a diagram showing the difference between operation speeds of a warmed-up lathe and a relatively cold lathe.

As shown in FIG. 2 a screw machine has a housing 31 in which a headstock spindle 17 is rotatable about an axis A. This spindle 17 is provided with a collet 19 and with an internal centering sleeve 18. The collet 19 has a front end formed with a square-section aperture 34. The round-section hole through the centering sleeve 18 is slightly larger in diameter, here by between 0.2 and 0.3 mm, than the diagonal width of the aperture 34. A motor 37 serves to rotate the spindle 17 about the axis A and a hydraulic arrangement or cam shaft control system 38 is provided for clamping a bar 20 in the collet 19. The lathe is also provided with a cutting tool 32 and an end stop 33 of conventional design.

The bars 20 as also shown in FIG. 3 are of square section and are of varying length. They are held in a magazine 1 and are fed to a pusher arrangement comprising a bar holding clamping sleeve 3 connected via a bearing 4 to a pusher 5. A chain 7 spanned between a pair of sprockets 8 and 10 carried on respective shafts 41 and 36 has a flag or block 6 carrying the pusher 5. A guide tube 2 as described in the above-mentioned copending patent application is provided for the pusher 5 and the bar 20 held in the clamping sleeve 3. A motor 9 can rotate the sprocket 8 in either direction.

In accordance with the present invention the shaft 36 is connectable via a clutch 11 to another shaft 42 on which is carried a gear 12 meshing with the longitudinally displacable rack 13 normally pulled forwardly by a spring 14 engaging between the front end of the rack 13 and a fixed frame member 35. The rear end of the rack 13 is provided with an actuating element 43 engageable with a front limit switch 30, a middle limit switch 26, and a rear limit switch 28. In addition, a solenoid 24 carried on the frame 35 has an abutment or core member 25 engageable with the element 43. Furthermore, when engaged against the switch 28 the element 43 rests against the stop 27 on the frame 35.

Immediately in front of the front end of the guide tube 2 is a detector 16 which is capable of detecting the presence of a bar past the end of this tube 2 without touching it. Such a detector 16 may operate magnetically.

In addition the rear (bar centering) end of the spindle 17 is formed as shown in FIG. 3 with four angularly equispaced cams 22 orbitable past another magnetic detector 21 connected to an output device 23 which can detect the rotation speed of the spindle 17 and can generate an output when this rotation speed drops below a predetermined threshold limit.

The switches 26, 28, and 30, the output device 23, the detector 16, the motors 9 and 37, the clutch 11, the camshaft control system 38, and the solenoid 24 are all connected to a central controller 40 in which is provided a timer 39.

As shown in FIG. 1 a lathe normally attains machining speed in a time $T_A$ which, along with the machining speed, is at least partially dependent on the temperature of the machine. This temperature is determined by how long it has run so that a warmed-up machine will more quickly attain a faster machining speed than a cold machine. Similarly, once the machine is shut off the time $T_B$ it takes for the machine to slow down to a zero rotational speed is also determined by how warm the machine is, the warmer machine taking substantially more time. In accordance with the present invention it has been found that the ideal feed range, that is the rotational speed range in which it is best to feed in a workpiece, has a width of 0.5 rpm, and a lower limit which lies above 0 rpm. Thus it is clear that a simple time-dependent arrangement cannot be effectively used to determine the workpiece feed rate.

The apparatus according to this invention functions as follows:

The spindle drive 37 is switched off and the collet 19 is opened by means of the camshaft control system 38, both operated by the controller 40. Thereupon the controller 40 operates the motor 9 so as to advance a bar 20 toward the collet along the axis A. As soon as the front end of the bar 20 passes the sensor 16 a signal is fed by this sensor 16 to the controller 40 which locks the clutch 11 and thereby rotationally interconnects the shaft 36 with the shaft 42.

Continued displacement of the bar 20 by the pusher 5 will, therefore, be accompanied by rotation of the gear 12 to displace the rack 13 so that the abutment element 43 will move from the one stop 15 toward the other stop 27. As the front end of the bar 20 moves through a distance L into a position immediately adjacent the orifice 34 the element 43 will correspondingly move through a distance $L_1$ until it comes against the abutment 25 and simultaneously closes the switch 26. At the same time the sensor 21 is detecting the rotational speed of the spindle 17. If the rotational speed of the chuck 17 lies outside the desired feed range no output will be produced by the device 23. The controller 40 will in this case not actuate the electromagnet 24 to move the abutment 25 out of the way of the element 43 so that continued displacement of this element 43 will be impeded. The motor 9 will continue to be energized, but this motor 9 is a relatively low torque motor so that the pusher 5 will be arrested along with the element 43.

As soon as the spindle 17 rotates at a speed within the desired rotational range the device 23 will produce an output that will be fed to the controller 40 that will in turn actuate the electromagnet 24 to withdraw the abutment 25 and allow further displacement of the element 43 and of the bar 20.

Since the spindle 17 is still rotating at a relatively low speed at this time the hole 34 will almost inevitably align itself with the nonround bar 20 so that the pusher 5 can advance this bar 20 through the orifice 34 by a distance S. This will be accompanied by corresponding displacement through a distance $S_1$ of the element 43 until it comes into abutment with the stop 27 and simultaneously closes the limit switch 28. Such arresting of the element 43 will again arrest the pusher 5 and closure of the switch 28 will report to the controller that the bar 20 is properly positioned. The controller 40 will then open the clutch 11 and allow the spring 14 to pull the rack 13 back to its starting position. The machining will take place in the normal fashion at this time.

The timer 39 in the controller 40 is started the instant the signal is generated by the device 23. If within a predetermined time after generation of this signal the switch 28 is not actuated, indicating that the workpiece is in place, the controller 40 will reverse the motor 7 and if necessary start up the lathe via the motor 37 again, then repeat the entire operation. The controller 40 will therefore reactuate the solenoid 24 so as to push the rack 13 back to the position shown in FIG. 2 and will simultaneously start the motor 37 up. As soon as the switch 26 is actuated, however, the cycle will be repeated and the motor 37 will be disconnected so as to attempt another fitting of the bar 20 through the orifice 34.

Such an operation is necessary occasionally when the bar 20 and aperture 34 do not line up right the first time. After several such tries, however, the controller 40 will shut down the entire machine and ring an alarm or light an alarm light to indicate to the operator that it cannot load the workpiece held in the chuck 3. This happens occasionally when a workpiece having a damaged front end is put in the magazine 1, or when the wrong type of bar is put in the magazine 1.

With the system according to this invention it is therefore possible for a machine automatically to load with nonround-section bars. The loading is quick and simple and the device can readily be provided on an existing lathe. The only addition to the existing lathe other than the new feed mechanism, is the provision of the cams 22 on the back of the spindle 17 and the provision of the sensor switch 21.

It will be understood that each of the elements described above, or two or more together may also find another application in other types of system differing from the types described above.

While the invention has been illustrated and described as embodied in a screw machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of feeding an elongated profiled bar to a screw machine having a headstock whose collet has an openable aperture that complements the cross-sectional shape of said bar and wherein the collet is closed on said bar and driven at a relatively high rotational speed during machining, said method comprising the steps of:
   holding said collet open;
   detecting the rotational speed of said collet and generating a speed output only when said rotational speed lies within a predetermined relatively low-speed range;
   pushing said bar longitudinally forwardly toward said collet only in response to generation of said speed output, whereby when the open aperture and said bar align the latter can pass forwardly through the former; and
   closing said collet on said bar only after passing of same forwardly through said aperture.

2. The method defined in claim 1, further comprising the steps prior to pushing of said bar forwardly of:
   advancing said bar to a position immediately adjacent said collet, and
   thereafter inhibiting further advance of said bar until said speed output is generated.

3. A method of feeding an elongated profiled bar to a screw machine having a headstock whose collet has an openable aperture that complements the cross-sectional shape of the bar and wherein the collet is closed on the bar and driven at a relatively high rotational speed during machining of the bar, said method comprising the steps of:
   a. detecting the rotational speed of said collet and generating a speed output only when said rotational speed lies within a predetermined range;
   b. holding said aperture open and pushing the bar forwardly longitudinally toward said collet only in response to generation of said speed output, whereby the bar and said aperture are aligned the former can pass forwardly through the latter;
   c. closing said collet on the bar only when same has passed forwardly through said aperture;
   d. generating a position output only when the bar has been passed forwardly through said aperture; and
   e. withdrawing the bar backwardly from said collet after step b) when a predetermined time period elapses after generation of said speed output and before generation of said position output, whereby when said aperture and the bar do not align in step (b) it is possible to repeat this step (b).

4. The method defined in claim 3, further comprising the step of disconnecting the drive for said spindle before step (b) and reconnecting said drive after step (c).

5. In combination with a screw machine having a headstock provided with an openable and closable collet rotatable at high speed and having a throughgoing aperture of cross-sectional shape complementary to that of a bar to be machined at said high speed, a feed apparatus comprising:
   means for detecting the rotational speed of said collet and for generating a speed output only when said rotational speed lies within a predetermined low-speed range; and
   means for pushing said bar longitudinally forwardly toward said aperture only in response to generation of said speed output, whereby when said aperture and said bar align the latter can pass forwardly through the former.

6. The apparatus defined in claim 5, further comprising an abutment engageable with said means for pushing in a position thereof corresponding to close juxtaposition of said bar with said collet, and means for displacing said abutment out of the way of said means for pushing on generation of said output.

7. The apparatus defined in claim 6 wherein said means for displacing includes an electromagnet.

8. The apparatus defined in claim 6 wherein said means for pushing includes an element engageable with said abutment and means for linking said element with said abutment when said bar during movement toward said collet passes a predetermined position.

9. The apparatus defined in claim 5 wherein said collet is positively connected with a spindle, said spindle having a disconnectable drive, said apparatus further comprising means for disconnecting said drive and opening said collet before advance of said bar into a position immediately adjacent said collet, and means for closing said collet on said bar and connecting-up said drive after engagement of said bar through said collet.

10. In combination with a screw machine having a headstock provided with an openable and closable collet rotatable at high speed and having a throughgoing aperture of a cross-sectional shape complementary to that of a bar to be machined at said high speed, a feed apparatus comprising:

means for detecting the rotational speed of said collet and for generating a speed output only when said rotational speed lies within a predetermined range;

means for pushing the bar forwardly toward said aperture only in response to generation of said output, whereby when the bar and said aperture align the former passes forwardly through the latter;

means for generating a position output when the bar has been advanced forwardly through said aperture;

timer means for measuring the time elapsed after generation of said speed output and before generation of said position output; and means connected to said timer means for withdrawing the bar backwardly from said collet after pushing of the bar toward said collet when the time elapsed after generation of said speed output and before generation of said position output exceeds a predetermined limit.

* * * * *